United States Patent
Lu

(10) Patent No.: US 8,783,385 B2
(45) Date of Patent: Jul. 22, 2014

(54) ROCK BIT HAVING A MECHANICAL SEAL WITH SUPERIOR THERMAL PERFORMANCE

(75) Inventor: Xiaobin Lu, Coppell, TX (US)

(73) Assignee: Varel International Ind., L.P., Carrollton, TX (US)

( * ) Notice: Subject to any disclaimer, the term of this patent is extended or adjusted under 35 U.S.C. 154(b) by 297 days.

(21) Appl. No.: 13/046,328

(22) Filed: Mar. 11, 2011

(65) Prior Publication Data

US 2011/0297448 A1    Dec. 8, 2011

Related U.S. Application Data

(60) Provisional application No. 61/352,013, filed on Jun. 7, 2010.

(51) Int. Cl.
*E21B 10/00*    (2006.01)
*F16J 15/34*    (2006.01)
*E21B 10/25*    (2006.01)

(52) U.S. Cl.
CPC ............ *F16J 15/344* (2013.01); *F16J 15/3404* (2013.01); *E21B 10/25* (2013.01)
USPC ............................ 175/371; 175/359; 277/406

(58) Field of Classification Search
USPC .......... 175/359, 371, 337, 339; 277/408, 411, 277/406
See application file for complete search history.

(56) References Cited

U.S. PATENT DOCUMENTS

| | | |
|---|---|---|
| 4,613,004 A | 9/1986 | Shotwell |
| 4,753,304 A | 6/1988 | Kelly, Jr. |
| 5,570,750 A | 11/1996 | Williams |
| 6,209,185 B1 | 4/2001 | Scott |
| 6,684,966 B2 | 2/2004 | Lin et al. |
| 6,976,548 B2 * | 12/2005 | Neville et al. ................. 175/371 |
| 7,128,173 B2 | 10/2006 | Lin |
| 7,311,159 B2 | 12/2007 | Lin et al. |
| 2005/0274549 A1 * | 12/2005 | Yong et al. .................... 175/371 |

* cited by examiner

*Primary Examiner* — Yong-Suk (Philip) Ro
(74) *Attorney, Agent, or Firm* — Gardere Wynne Sewell LLP; Andre M. Szuwalski

(57) ABSTRACT

A drill tool includes a bit body, at least one bearing shaft extending from the bit body and a cone mounted for rotation on the bearing shaft. A mechanical seal is disposed between the bearing shaft and the cone in a seal gland. The mechanical seal includes a rigid seal ring having a dynamic sealing surface with the cone and another non-sealing surface exposed to an aperture in the seal gland. The mechanical seal further includes at least one cooling channel formed in the another non-sealing surface of the rigid seal ring, the cooling channel having an open end in fluid communication with the aperture in the seal gland.

20 Claims, 10 Drawing Sheets

ROCK BIT HAVING A MECHANICAL SEAL WITH SUPERIOR THERMAL PERFORMANCE

PRIORITY CLAIM

The present application claims the benefit of U.S. Provisional Application for Patent No. 61/352,013 filed Jun. 7, 2010, the disclosure of which is hereby incorporated by reference.

TECHNICAL FIELD

The present invention relates generally to rock bit drilling tools. The present invention more specifically concerns roller cone drilling tools and the bearing seal used within such roller cone drilling tools.

BACKGROUND

A roller cone rock bit is a common cutting tool used in oil, gas, and mining fields for breaking through earth formations and shaping well bores. Reference is made to FIG. 1 which illustrates a partially broken away view of a typical roller cone rock bit. FIG. 1 more specifically illustrates one head and cone assembly. The general configuration and operation of such a bit is well known to those skilled in the art.

The head 1 of the bit includes the bearing shaft 2. A cutting cone 3 is rotatably positioned on the bearing shaft 2 which may function as a journal. A body portion of the bit includes an upper threaded portion forming a tool joint connection 4 which facilitates connection of the bit to a drill string (not shown). A lubrication system 6 is included to provide lubricant to, and retain lubricant in, the journal bearing between the cone 3 and the bearing shaft 2. This system 6 has a configuration and operation well known to those skilled in the art.

The bearings used in roller cone rock bits typically employ either rollers as the load carrying element or a journal (as shown in FIG. 1) as the load carrying element. A number of bearing systems are provided in connection with the journal bearing supporting rotation of the cone 3 about the bearing shaft 2. These bearing systems include a first cylindrical friction bearing 10 (also referred to as the main journal bearing), ball bearings 12, second cylindrical friction bearing 14, first radial friction (thrust) bearing 16 and second radial friction (thrust) bearing 18.

FIG. 2 illustrates a partially broken away view of FIG. 1 showing the bearing system in greater detail focused on the area of the main journal bearing. The first cylindrical friction bearing (main journal bearing) 10 is defined by an outer cylindrical surface 20 on the bearing shaft 2 and an inner cylindrical surface 22 of a bushing 24 which has been press fit into the cone 3. This bushing 24 is a ring-shaped structure typically made of beryllium copper, although the use of other materials is known in the art. The ball bearings 12 ride in an annular raceway 26 defined at the interface between the bearing shaft 2 and cone 3.

With reference once again to FIG. 1, the second cylindrical friction bearing 14 is defined by an outer cylindrical surface 30 on the bearing shaft 2 and an inner cylindrical surface 32 on the cone 3. The outer cylindrical surface 30 is inwardly radially offset from the outer cylindrical surface 20. The first radial friction bearing 16 is defined between the first and second cylindrical friction bearings 10 and 12 by a first radial surface 40 on the bearing shaft 2 and a second radial surface 42 on the cone 3. The second radial friction bearing 18 is adjacent the second cylindrical friction bearing 12 at the axis of rotation for the cone and is defined by a third radial surface 50 on the bearing shaft 2 and a fourth radial surface 52 on the cone 3.

Lubricant is provided in the first cylindrical friction bearing 10, second cylindrical friction bearing 14, first radial friction bearing 16 and second radial friction bearing 18 between the opposed cylindrical and radial surfaces using the system 6. It is critical to retain the lubricant in positions between the opposed surfaces of the bearing system. Retention of the lubricant requires that a seal be formed between the bearing system and the external environment of the bit.

Early seals for rock bits were designed with a metallic Belleville spring clad with an elastomer, usually nitrile rubber (NBR). A significant advancement in rock bit seals came when o-ring type seals were introduced (see, Galle, U.S. Pat. No. 3,397,928, the disclosure of which is hereby incorporated by reference). These o-ring seals were composed of nitrile rubber and were circular in cross section. The seal was fitted into a radial gland (see, FIG. 2 and references 60 and 64) formed by cylindrical surfaces between the head and cone bearings, and the annulus formed was smaller than the original dimension as measured as the cross section of the seal. Schumacher (U.S. Pat. No. 3,765,495, the disclosure of which is hereby incorporated by reference) teaches a variation of this seal by elongating the radial dimension which, when compared to the seal disclosed by Galle, required less percentage squeeze to form an effective seal. See, generally, FIG. 2 and references 60 and 64.

Several other minor variations of this sealing concept have been used, each relying on an elastomer seal squeezed radially in a gland formed by cylindrical surfaces between the two bearing elements, and are well known to those skilled in the art. Over time, the rock bit industry has moved from a standard nitrile material for the seal ring, to a highly saturated nitrile elastomer for added stability of properties (thermal resistance, chemical resistance).

The use of a sealing means in rock bit bearings has dramatically increased bearing life in the past fifty years. The longer the seal excludes contamination from the bearing, the longer the life of the bearing and drill bit. The seal is, thus, a critical component of the rock bit.

With continued reference to FIG. 2, an o-ring seal 60 is positioned in a seal gland 64 between cutter cone 3 and the bearing shaft 2 to retain lubricant and exclude external debris. A cylindrical surface seal boss 62 is provided on the bearing shaft. In the illustrated configuration, this surface of the seal boss 62 is outwardly radially offset (by the thickness of the bushing 24) from the outer cylindrical surface 20 of the first friction bearing 10. It will be understood that the seal boss could exhibit no offset with respect to the main journal bearing surface if desired. The annular seal gland 64 is formed in the cone 3. The gland 64 and seal boss 62 align with each other when the cutting cone 3 is rotatably positioned on the bearing shaft. The o-ring seal 60 is compressed between the surface(s) of the gland 64 and the seal boss 62, and functions to retain lubricant in the bearing area around the bearing systems. This seal also prevents materials (drilling mud and debris) in the well bore from entering into the bearing area.

Reference is now made to FIG. 3 which illustrates an alternative implementation for the seal gland retaining an o-ring seal. Like reference numbers refer to same or similar parts. The implementation of FIG. 3 differs from that of FIG. 2 in the implementation of the seal gland geometry.

It is not unusual for the o-ring seal to leak or fail leading to grease starvation in the surface contact zones of the bearing system. This can result in scoring, scuffing, and even catastrophic failure like galling or seizure. It is thus critical to provide a sealing means capable of retaining lubricant in positions of the rock bit between the opposed cylindrical and radial surfaces of the bearing system.

Mechanical (or rigid) face seals have also been developed to effectively separate the mud and debris environment from the lubricant. These seals provide superior performance over elastomer seals in high sliding velocity sealing environments. Such environments subject the elastomer seals to excessive friction and abrasive wear which leads to seal failure.

Reference is made to FIGS. 4A and 4B which illustrate a partially broken away view of a sealing system using a conventional mechanical (or rigid) face seal. The sealing system includes a rigid ring 100 and a resilient energizing ring 102 (for example, in the form of an o-ring). The rings 100 and 102 are installed in a seal gland 104 formed in the roller cone 106. The rigid ring 100 includes a radial seal face 108 which mates with a corresponding radial seal face 110 carried by the cone 106. More specifically, the corresponding radial seal face 110 carried by the cone 106 is formed on a seal sleeve member 112 that is interference fit into the cone 106. The resilient energizing ring 102 is compressed between an inner surface 114 of the rigid ring 100 and an outer sealing surface 116 of the bearing shaft 118. The compression of the resilient energizing ring 102 urges the rigid ring 100 toward the seal sleeve member 112 so as to maintain the radial seal faces 108 and 110 in dynamic sealing engagement and further forms a static sealing surface with the bearing shaft 118.

FIG. 4C shows a plan view of the rigid ring 100 looking towards the radial seal face 108.

It is common in current designs for mechanical face seals used in roller cone rock bits to have extremely high face loads at the radial seal faces 108 and 110 so as to assure sealing contact. This high pressure (for example, on the order of a couple hundred psi, or more) results in a large friction force and high frictional heat flux within the seal. The seal of the rock bit accordingly tends to "run hot," and thermal-related seal failures (such as ring distortion, excessive wear rate and ring seizure) are commonly encountered.

There is a need for an improved mechanical seal which provides for better thermal performance than prior art mechanical seals. Preferably, a mechanical seal is needed having a configuration which reduces seal operating temperatures and provides for an extended seal life.

Reference is further made to the following prior art references which illustrate numerous examples of mechanical seals for use in roller cone rock bits (the disclosures of all references are incorporated herein by reference): U.S. Pat. Nos. 4,613,004, 4,753,304, 5,570,750, 6,209,185, 6,684,966, 7,128,173 and 7,311,159.

SUMMARY

Cooling channels are introduced into a rigid seal ring of a mechanical seal for a roller cone rock bit. The cooling channels may take the form of grooves, serrations, scallops, or blind holes. In a preferred implementation the channel(s) is (are) formed on a peripheral surface of the rigid seal ring which is exposed to drilling mud. The provided cooling channel functions to dissipate heat from the dynamic sealing face of the rigid seal ring in order to minimize thermal-related seal failures.

An embodiment comprises a mechanical seal provided with a cooling channel that dissipates frictional heat generated at a dynamic seal contact surface of the mechanical seal. This implementation reduces seal operating temperature and thus addresses thermal-related failures of the seal such as seizure, thermal distortion and excessive surface wear. An extension of seal life results from use of the cooling channels in a mechanical seal.

In an embodiment, a drill tool comprises: a bit body; at least one bearing shaft extending from the bit body; a cone mounted for rotation on the bearing shaft; and a mechanical seal disposed between the bearing shaft and the cone in a seal gland. The mechanical seal includes a rigid seal ring having a dynamic sealing surface with the cone and another non-sealing surface exposed to an aperture in the seal gland. The mechanical seal further includes at least one cooling channel formed in the another non-sealing surface of the rigid seal ring, the cooling channel having an open end in fluid communication with the aperture in the seal gland.

In an embodiment, an apparatus comprises a mechanical seal adapted to be positioned between a journal and a rotating member, the mechanical seal defining a dynamic seal and including a rigid seal ring having a dynamic sealing surface and a non-sealing surface. The mechanical seal includes at least one cooling channel formed in the non-sealing surface of the rigid seal ring.

DETAILED DESCRIPTION OF THE DRAWINGS

Figure 5A:
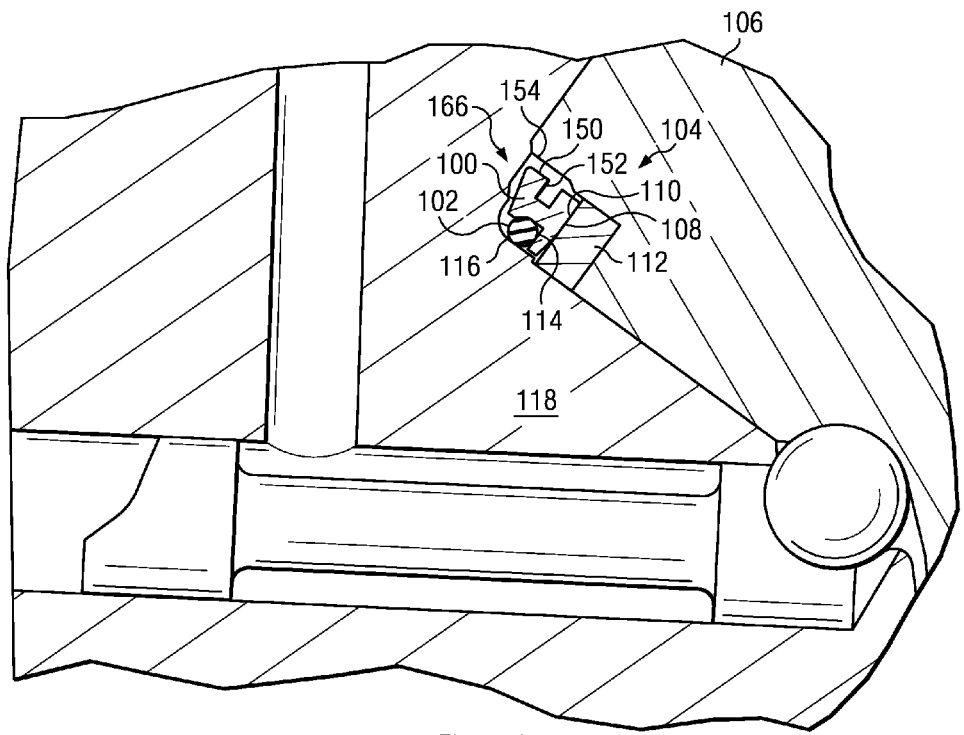
FIGS. 5A and 5B illustrate a partially broken away view of a sealing system using a mechanical (or rigid) face seal in accordance with an embodiment of the present invention.
Figure 5B:
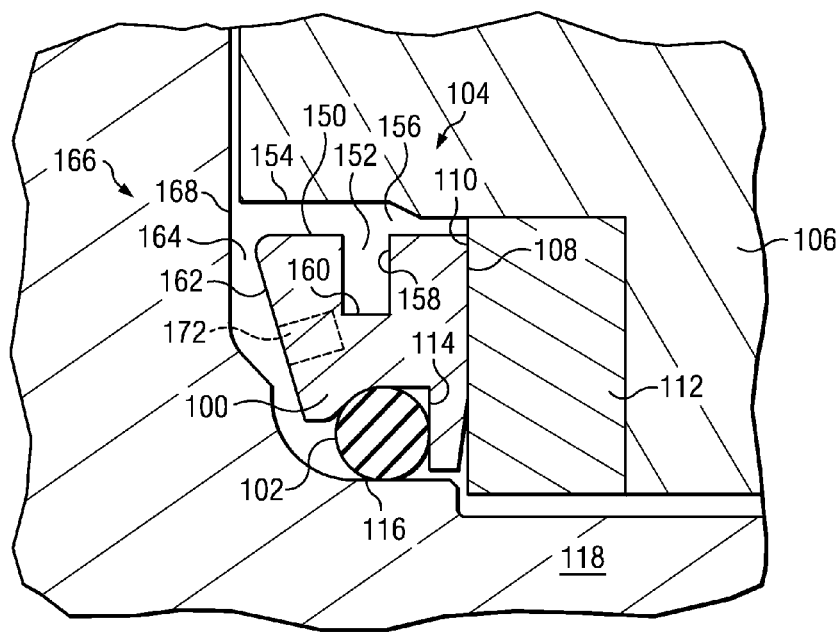

Reference is now made to FIGS. 5A and 5B which illustrate a partially broken away view of a sealing system using a mechanical (or rigid) metal face seal in accordance with an embodiment of the present invention. The sealing system includes a metal rigid ring 100 having a full metal body and a resilient energizing ring 102 (for example, in the form of an o-ring). The rings 100 and 102 are installed in a seal gland 104 formed in the roller cone 106. The rigid ring 100 includes a radial metal seal face 108 which mates with a corresponding radial metal seal face 110 carried by the cone 106. More specifically, the corresponding radial metal seal face 110 carried by the cone 106 is formed on a metal seal sleeve member 112 having a full metal body that is interference fit into the cone 106. The resilient energizing ring 102 is compressed between an inner surface 114 of the rigid ring 100 and an outer sealing surface 116 of the bearing shaft 118. The compression of the resilient energizing ring 102 urges the rigid ring 100 toward the seal sleeve member 112 so as to maintain the metal radial seal faces 108 and 110 in dynamic sealing engagement.

Figure 1:
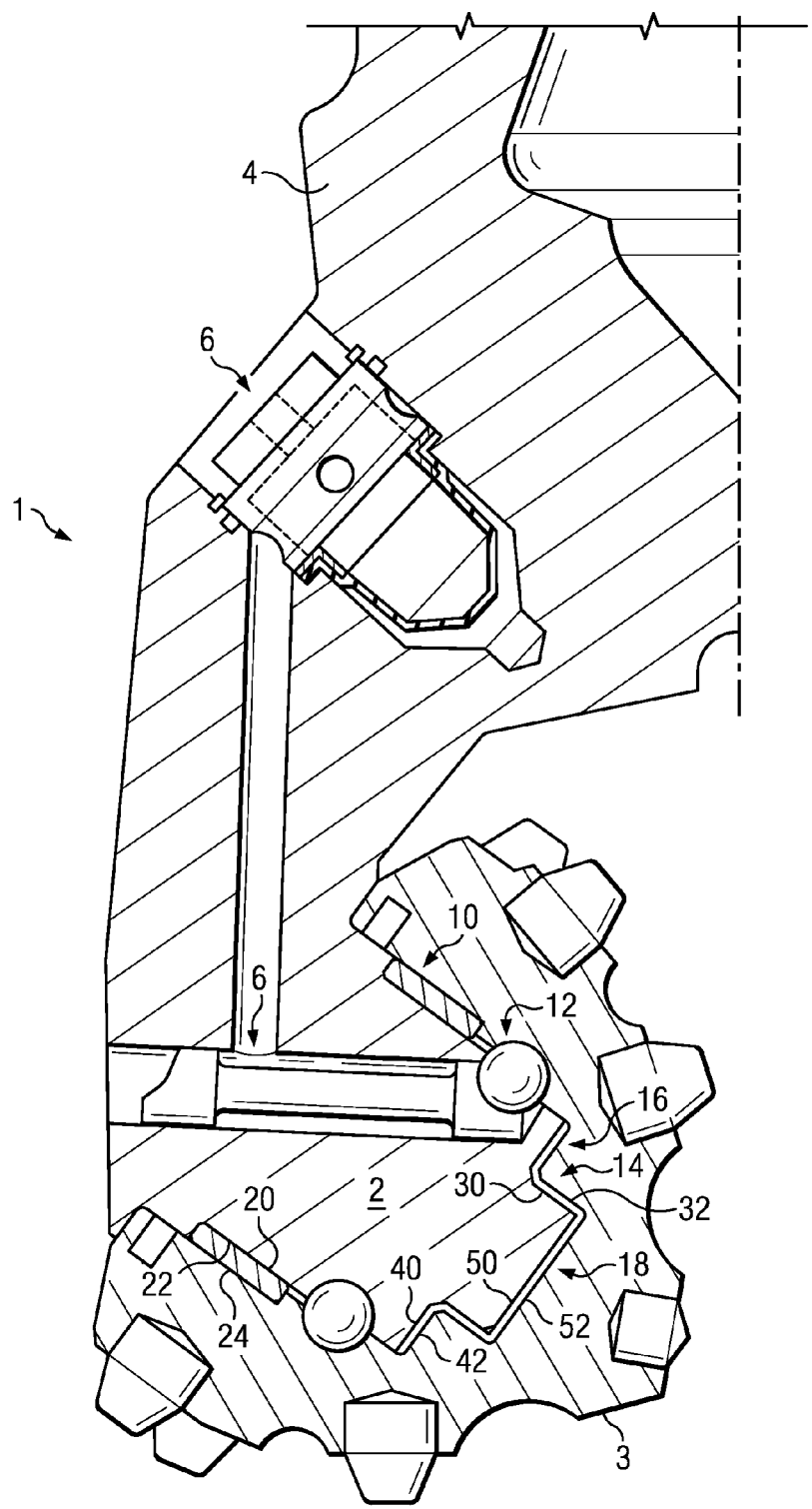
FIG. 1 illustrates a partially broken away view of a typical roller cone rock bit.
Figure 2:
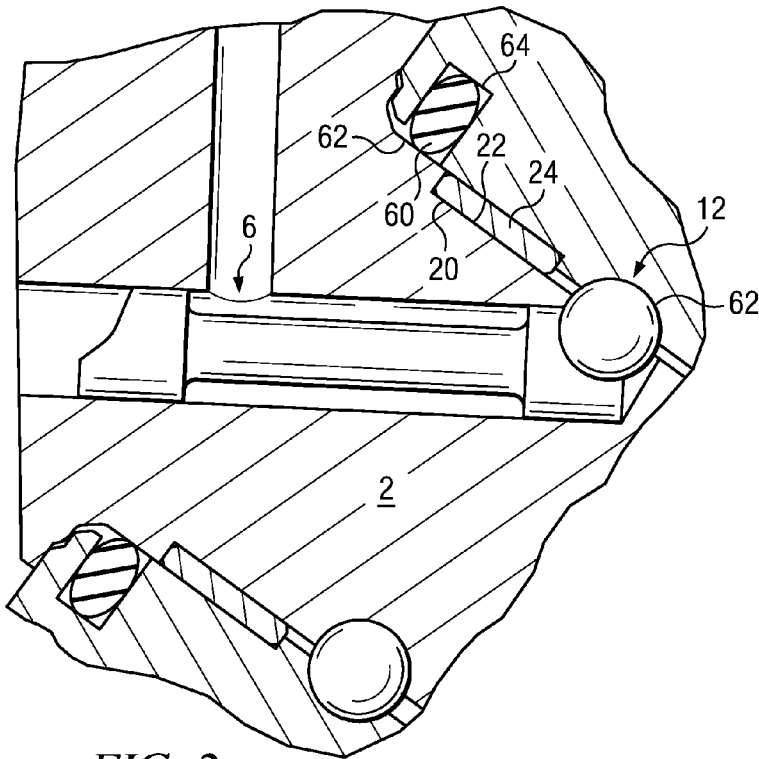
FIG. 2 illustrates a partially broken away view of FIG. 1 showing the bearing system in greater detail.
Figure 3:
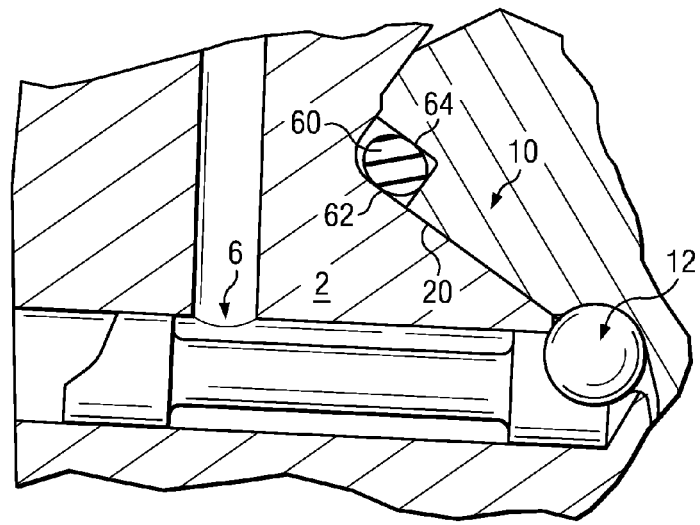
FIG. 3 illustrates an alternative implementation for the seal gland retaining an o-ring seal.
Figure 4A:
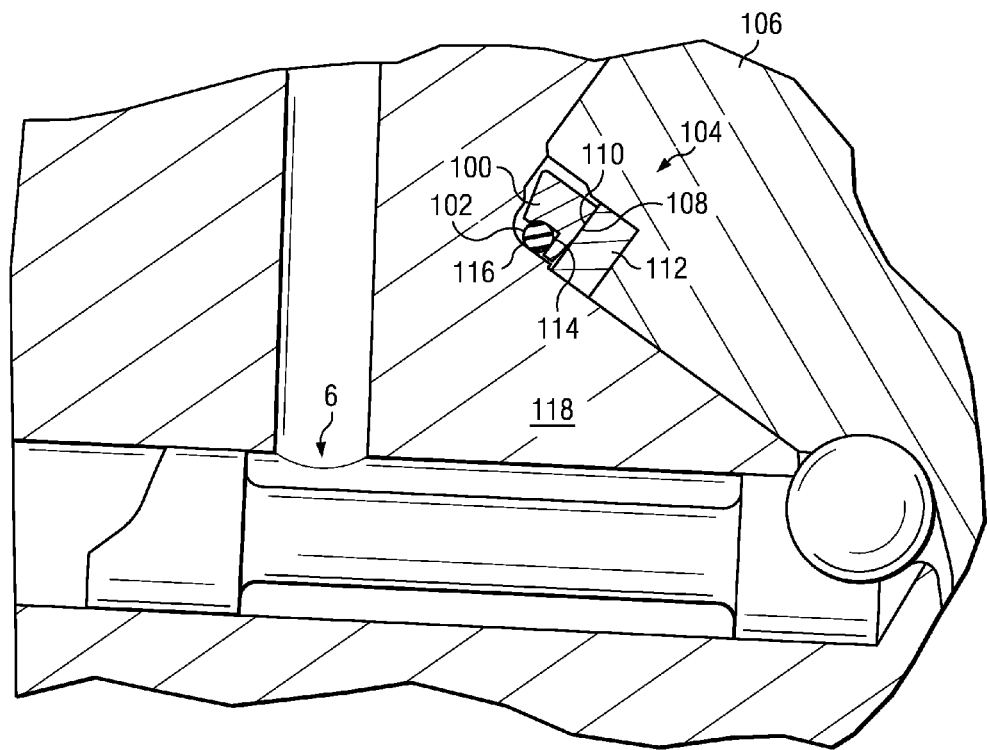
FIGS. 4A and 4B illustrate a partially broken away view of a sealing system using a conventional mechanical (or rigid) face seal.
Figure 4B:
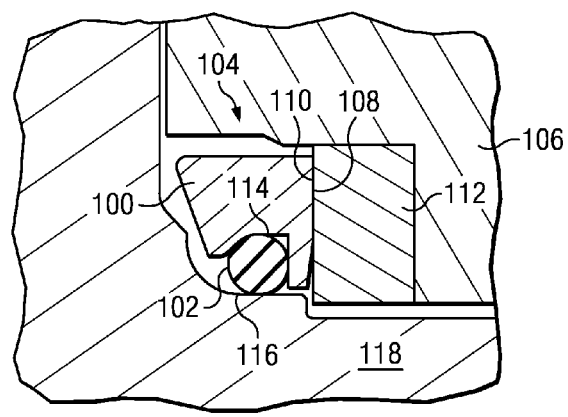
Figure 4C:
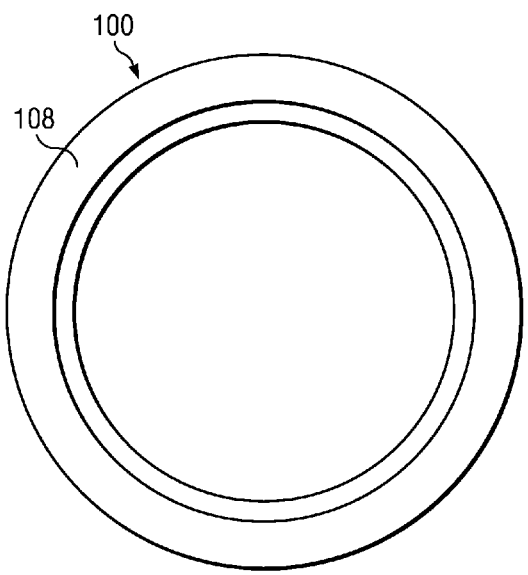
FIG. 4C shows a plan view of the rigid ring of the mechanical seal of FIGS. 4A and 4B looking towards the radial seal face.

The rigid ring 100 further includes a metal outer surface 150 which is adjacent to an inner surface 154 of the seal gland 104 on the roller cone 106. The outer surface 150 is a non-sealing surface oriented generally perpendicular to the seal face 108 and defines an outer diameter of the rigid ring 100. An annular aperture 156 is formed by the seal gland 104 between the outer surface 150 and inner surface 154. During operation of the bit, this annular aperture 156 fills with drilling mud. As is known to those skilled in the art, that drilling mud functions as the primary cooling media for the bit and the flow of drilling mud within the annular aperture helps to cool the rigid ring 100. To enhance the cooling effect, the rigid ring 100 shown in FIGS. 5A and 5B further includes an annular groove 152 formed in the outer surface 150 extending into the metal body of the rigid ring 100 and having an open end which is in fluid communication with the annular aperture 156 of the seal gland. This annular groove 152 encircles the periphery of the rigid ring 100 (i.e., the groove is preferably circumferential and continuous, although in an embodiment non-continuous circumferential groove segments may be used). The side walls 158 and floor 160 (which is opposite the open end) of the annular groove 152 provide additional surface area on the outer surface 150 which is then in contact with the cooling mud to assist in enhancing cooling of the rigid ring 100. The groove 152 is positioned close to the radial seal face 108, and improves the efficiency of convective heat transfer away from the radial seal faces 108 and 110 which are in sealing engagement. The groove 152 accordingly forms a cooling channel which improves the thermal performance of the mechanical face sealing system in comparison to prior art configurations such as that shown in FIGS. 4A-4C.

Figure 5C:
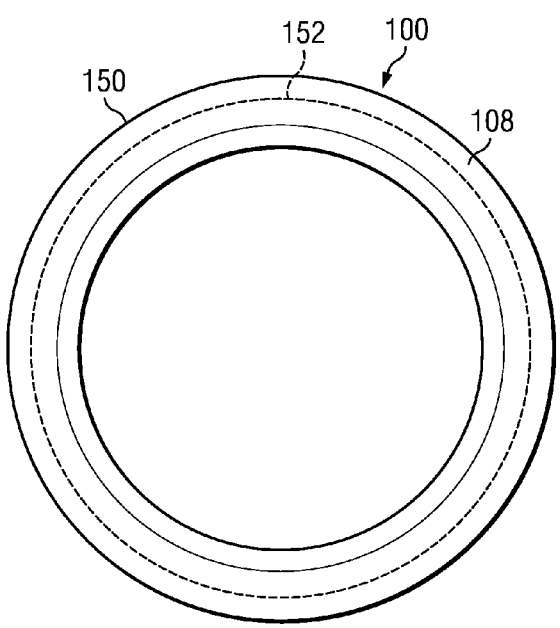
FIG. 5C shows a plan view of the rigid ring of the mechanical seal of FIGS. 5A and 5B looking towards the radial seal face.

FIG. 5C shows a plan view of the rigid ring 100 looking towards the radial seal face 108. The dotted line in FIG. 5C shows the depth of the groove 152 which has been formed to circumferentially traverse continuously around the outer surface 150 of the rigid ring 100. Again, in an alternative embodiment, the groove 152 may instead be formed of a plurality of non-continuous circumferential groove segments extending around the perimeter defined by the outer surface 150.

Figure 5D:
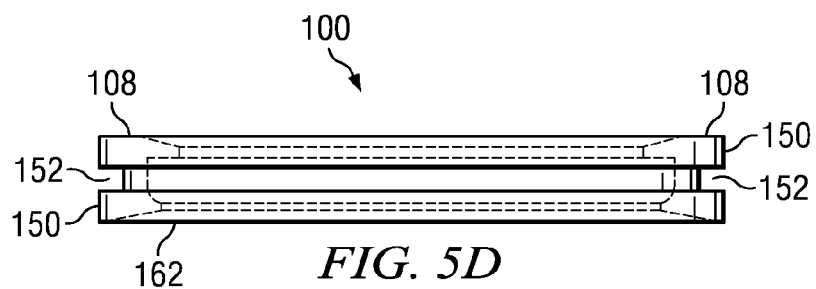
FIG. 5D shows a side view of the rigid ring looking towards the non-sealing surface.

FIG. 5D shows a side view of the rigid ring 100 looking towards the non-sealing surface 150.

In the preferred implementation, the groove 152 is formed to circumferentially traverse around the outer surface 150 of the rigid ring 100. In an alternative implementation, the groove 152 may instead be implemented as a circular groove 172 formed in the radial inner surface 162 of the rigid ring 100. This implementation is illustrated in dotted lines in FIGS. 5A and 5B. The surface 162 is also a non-sealing surface and is sloped with respect to the seal surface 108 and a distance between the surface 162 and the surface 108 generally defines a thickness of the rigid ring 100. It will be noted that an aperture 164 is formed by the seal gland 104 between the radial inner surface 162 and a radial head surface 168 at the base region 166 of the head adjacent to the bearing shaft 118. During operation of the bit, this aperture 164 fills with drilling mud, and the circular groove 172 functions, like the groove 152, as a cooling channel providing additional surface area on the outer surface 162. This thermal channel is in contact with the cooling mud so as to improve the thermal performance of the mechanical face sealing system by enhancing dissipation of heat from the rigid ring 100 (by convective heat transfer away from the radial seal faces 108 and 110 which are in sealing engagement). The groove 172 is preferably circularly continuous, although in an embodiment non-continuous encircling groove segments may be used.

By controlling groove depth and surface placement, in a possible implementation both groove 152 and groove 172 may be provided on the rigid ring 100. The grooves 152 and 172 may be either continuous of segmented. In one embodiment using segmented grooves 152 and 172, the angular positions of the segments for groove 152 are offset from the angular positions of the segments for the groove 172.

Figure 5E:
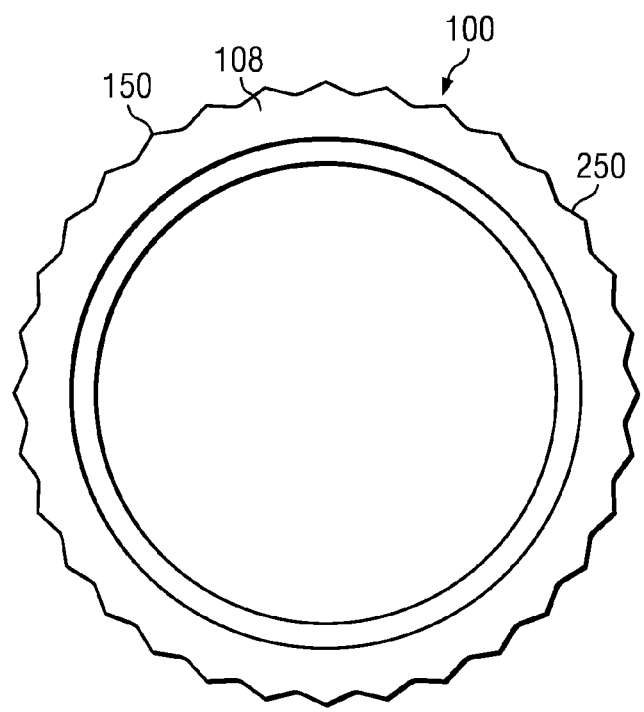
FIG. 5E shows a plan view of an alternative implementation for the rigid ring of the mechanical seal of FIGS. 5A and 5B looking towards the radial seal face.

Thus, while the grooves 152 and 172 are preferably implemented as uninterrupted channels, in a possible implementation either of the grooves 152 and 172 can be implemented as a set of arcuate channel segments. Alternatively, as shown in FIG. 5E, a set of serrations or scallops 250 (or other channel-like structures) may be formed on the surface 150, with the serrations or scallops assisting in heat transfer by providing additional surface area on the rigid ring 100 that is exposed to the cooling drilling mud. Alternatively, the serrations or scallops (or other channel-like structures) may be formed on the surface 162, again for the purpose of increasing the amount of exposed surface area for heat transfer and cooling.

Figure 6:
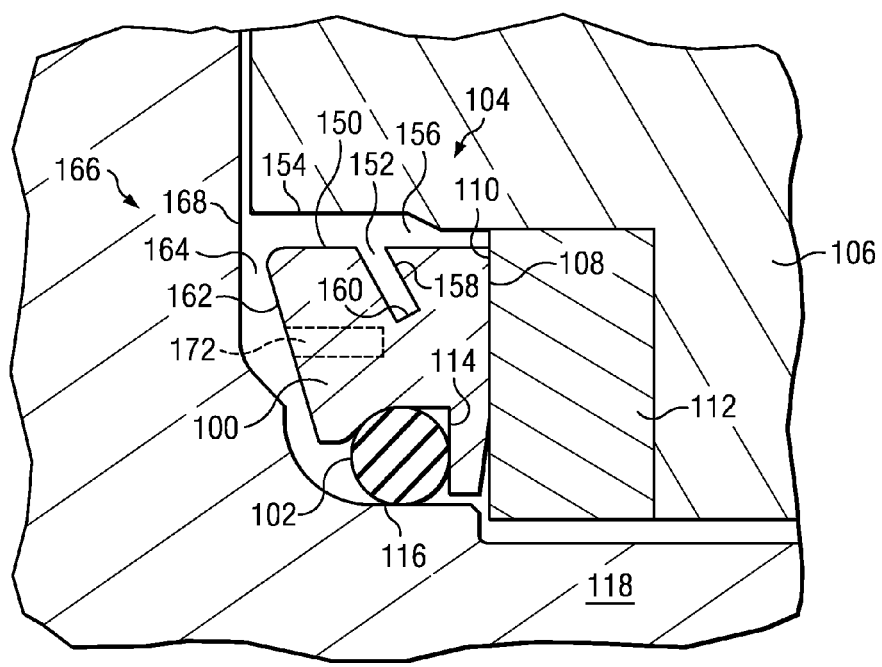
FIG. 6 illustrates a partially broken away view of a sealing system using a mechanical (or rigid) face seal in accordance with an embodiment of the present invention.

Reference is now made to FIG. 6 which illustrates a partially broken away view of a sealing system using a mechanical (or rigid) face seal in accordance with an embodiment of the present invention. This embodiment differs from the embodiment of FIGS. 5A-5C in that the annular groove 152 which encircles the periphery of the rigid ring 100 is not oriented perpendicular to the outer surface 150. This configuration may be advantageous in that the angling of the groove 152 moves the floor 160 of the groove closer to the radial seal face 108.

While the groove 172 of FIG. 5B is shown oriented perpendicular to the surface 162, it will be understood that groove 172 could alternatively be formed with a non-perpendicular orientation like that shown in FIG. 6.

Figure 7:
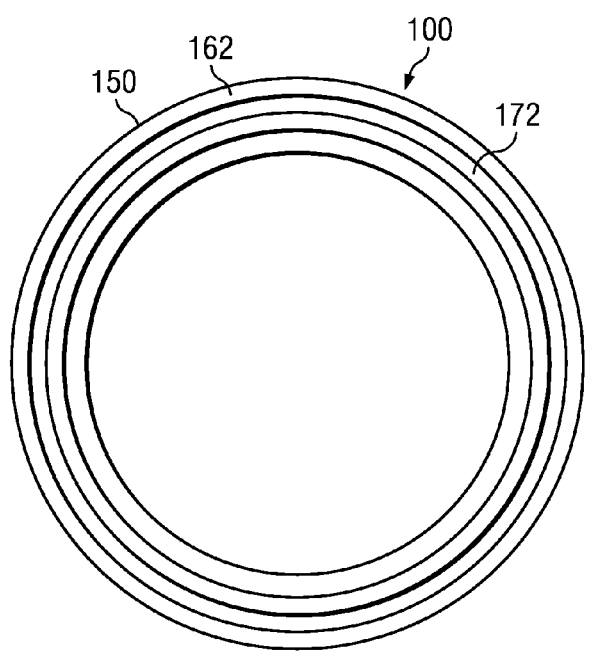
FIG. 7 shows a plan view of the rigid ring of the mechanical seal of FIGS. 5A-5B and 6 looking towards a rear non-sealing face for an alternative implementation.

Reference is now made to FIG. 7 which shows a plan view of the rigid ring 100 looking towards the non-sealing face 162 for the alternative implementation wherein groove 172 is provided in the non-sealing face 162 of the rigid ring.

Figure 8A:
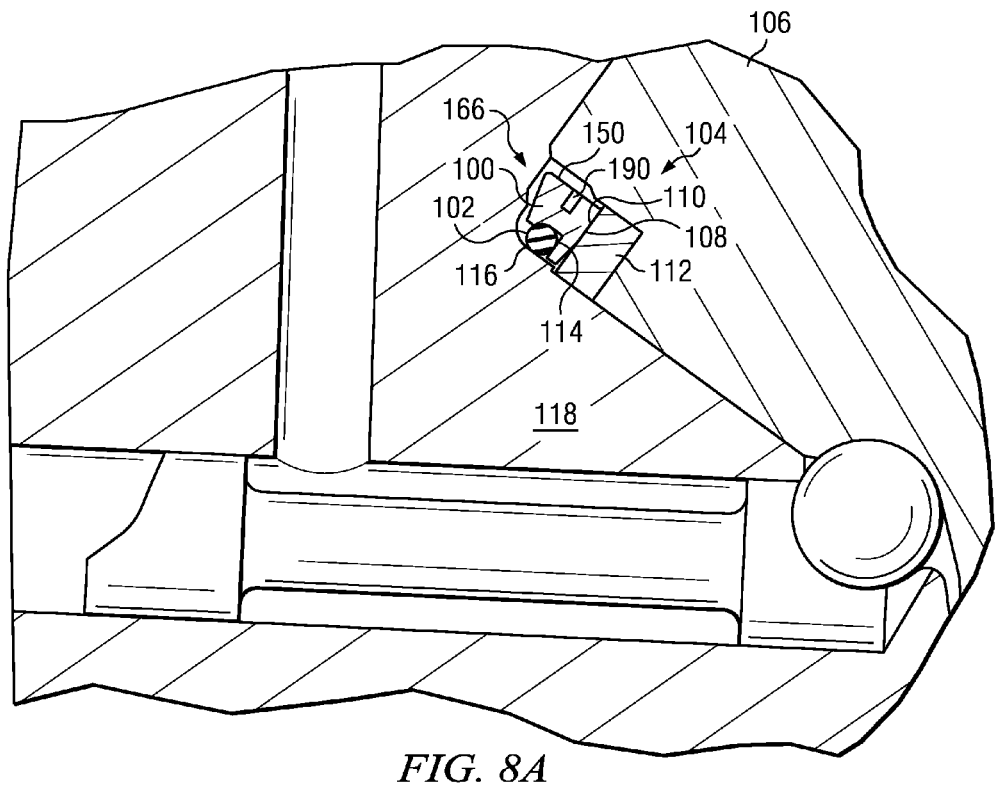
FIGS. 8A and 8B illustrate a partially broken away view of a sealing system using a mechanical (or rigid) face seal in accordance with an embodiment of the present invention.
Figure 8B:
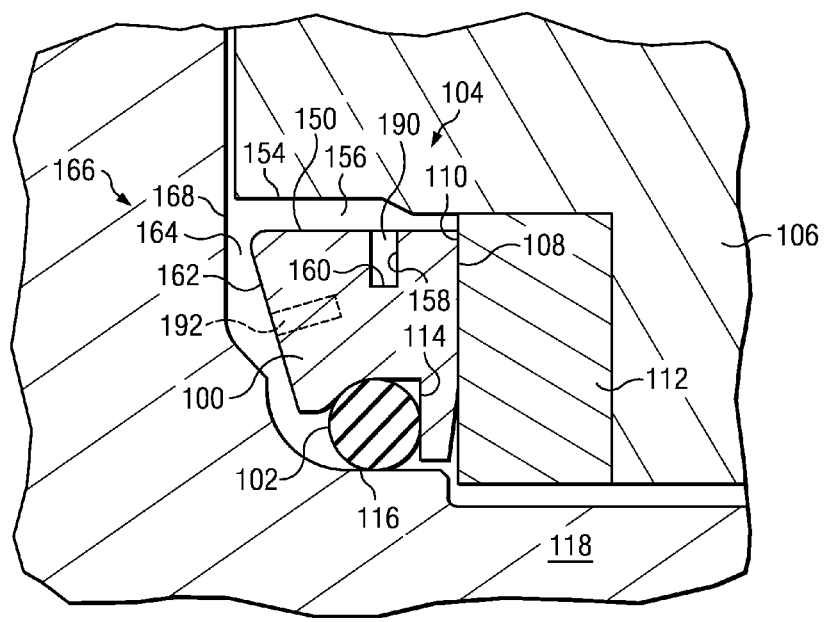

Reference is now made to FIGS. 8A and 8B which illustrate a partially broken away view of a sealing system using a mechanical (or rigid) metal face seal in accordance with an embodiment of the present invention. The sealing system includes a metal rigid ring 100 having a full metal body and a resilient energizing ring 102 (for example, in the form of an o-ring). The rings 100 and 102 are installed in a seal gland 104 formed in the roller cone 106. The rigid ring 100 includes a metal radial seal face 108 which mates with a corresponding metal radial seal face 110 carried by the cone 106. More specifically, the corresponding radial seal face 110 carried by the cone 106 is formed on a metal seal sleeve member 112 having a full metal body that is interference fit into the cone 106. The resilient energizing ring 102 is compressed between an inner surface 114 of the rigid ring 100 and an outer sealing surface 116 of the bearing shaft 118. The compression of the resilient energizing ring 102 urges the rigid ring 100 toward the seal sleeve member 112 so as to maintain the radial seal faces 108 and 110 in dynamic sealing engagement.

The rigid ring 100 further includes a metal outer surface 150 which is adjacent to an inner surface 154 of the seal gland 104 on the roller cone 106. The outer surface 150 is a non-sealing surface oriented generally perpendicular to the seal face 108 and defines an outer diameter of the rigid ring 100. An annular aperture 156 is formed by the seal gland 104 between the outer surface 150 and inner surface 154. During operation of the bit, this annular aperture 156 fills with drilling mud. As is known to those skilled in the art, that drilling mud functions as the primary cooling media for the bit and the flow of drilling mud within the annular aperture helps to cool the rigid ring 100. To enhance the cooling effect, the rigid ring 100 shown in FIGS. 8A and 8B further includes a set of blind holes 190 formed in the outer surface 150 extending into the metal body of the rigid ring 100 and each having an open end which is in fluid communication with the annular aperture 156 of the seal gland. These blind holes 190 are arranged to encircle the periphery of the rigid ring 100 (i.e., the holes 190 are circumferentially distributed). The side wall 158 and floor 160 (which is opposite the open end) of each hole 190 provide additional surface area on the outer surface 150 which is then in contact with the cooling mud to assist in enhancing cooling of the rigid ring 100. The set of blind holes 190 are positioned close to the radial seal face 108, and thus improve the efficiency of convective heat transfer away from the radial seal faces 108 and 110 which are in sealing engagement. The set of blind holes 190 accordingly form a plurality of cooling channels which improve the thermal performance of the mechanical face sealing system in comparison to prior art configurations such as that shown in FIGS. 4A-4C.

Figure 8D:
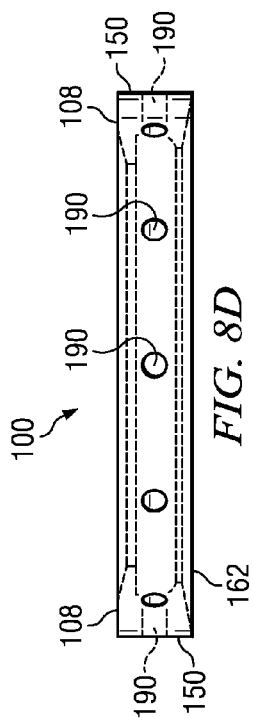
FIG. 8D shows a side view of the rigid ring 100 looking towards the non-sealing surface.
Figure 8C:
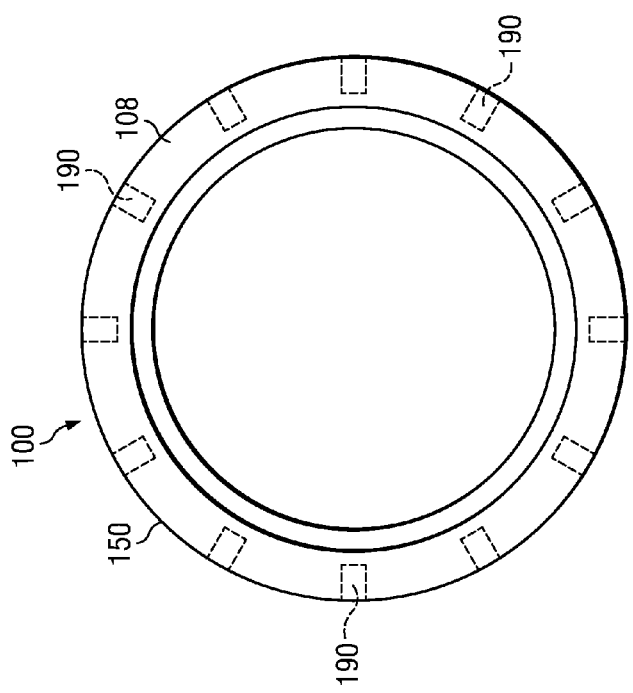
FIG. 8C shows a plan view of the rigid ring of the mechanical seal of FIGS. 8A and 8B looking towards the radial seal face.

FIG. 8C shows a plan view of the rigid ring 100 looking towards the radial seal face 108. The dotted line boxes in FIG. 8C show the circumferential placement and depth of the set of blind holes 190 that are circumferentially distributed about the outer surface 150 of the rigid ring 100. The number of illustrated holes 190 is exemplary only, it being understood that any suitable number of holes could be included.

FIG. 8D shows a side view of the rigid ring 100 looking towards the non-sealing surface 150.

In the preferred implementation, the set of blind holes 190 are formed with a circumferential distribution about the outer surface 150 of the rigid ring 100. In an alternative implementation, the set of holes 190 may instead be implemented as a circular set of blind holes 192 formed in the radial inner surface 162 of the rigid ring 100. This implementation is illustrated in dotted lines in FIGS. 8A and 8B. The surface 162 is also a non-sealing surface and is sloped with respect to the seal surface 108 and a distance between the surface 162 and the surface 108 generally defines a thickness of the rigid ring 100. It will be noted that an aperture 164 is formed in the seal gland 104 between the radial inner surface 162 and a radial head surface 168 at the base region 166 of the head adjacent to the bearing shaft 118. During operation of the bit, this aperture 164 fills with drilling mud, and the set of blind holes 192 function, like the set of holes 190, as a plurality of cooling channels providing additional surface area on the outer surface 162. These thermal channels are in contact with the cooling mud so as to improve the thermal performance of the mechanical face sealing system by enhancing dissipation of heat from the rigid ring 100 (by convective heat transfer away from the radial seal faces 108 and 110 which are in sealing engagement).

By controlling hole depth and surface placement, in a possible implementation both a set of blind holes 190 and a set of blind holes 192 may be provided on the rigid ring 100.

The individual holes 190 and 192 preferably have a circular cross-section. It will be recognized, however, that the individual holes 190 and 192 could instead have any selected geometric cross-section including, without limitation, square, rectangular, oval, elliptical, triangular, and the like. The illustrated relative size of the holes is exemplary only, it being understood that hole size can be selected based on application and size of the ring 100 and surfaces 150 and 162.

Figure 9:
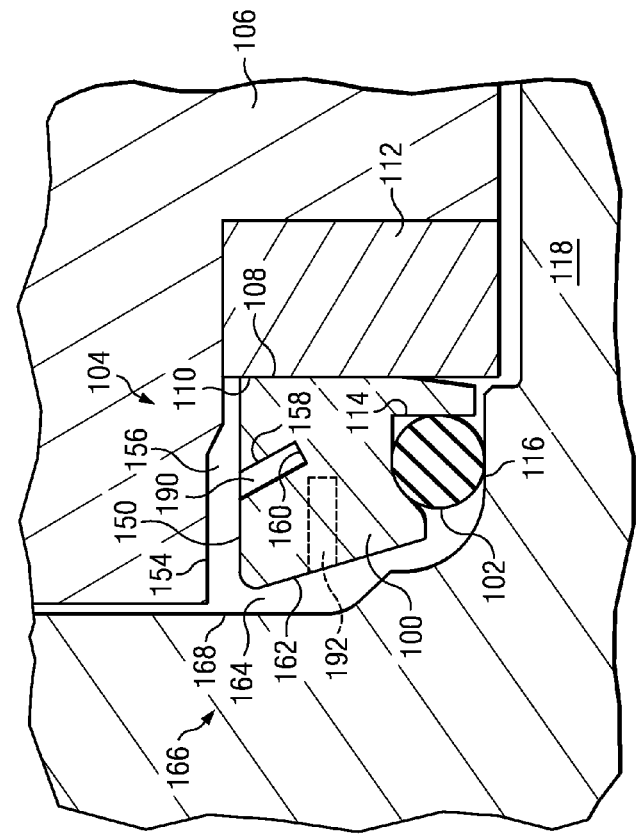
FIG. 9 illustrates a partially broken away view of a sealing system using a mechanical (or rigid) face seal in accordance with an embodiment of the present invention.

Reference is now made to FIG. 9 which illustrates a partially broken away view of a sealing system using a mechanical (or rigid) face seal in accordance with an embodiment of the present invention. This embodiment differs from the embodiment of FIGS. 8A-8C in that the set of blind holes 190 which are distributed about the periphery of the rigid ring 100 are not oriented perpendicular to the outer surface 150. This configuration may be advantageous in that the angling of the holes 190 moves the floor of each hole closer to the radial seal face 108.

While the holes 192 of FIG. 8B are shown oriented perpendicular to the surface 162, it will be understood that holes 192 could alternatively be formed with a non-perpendicular orientation like that shown in FIG. 8.

Figure 10:
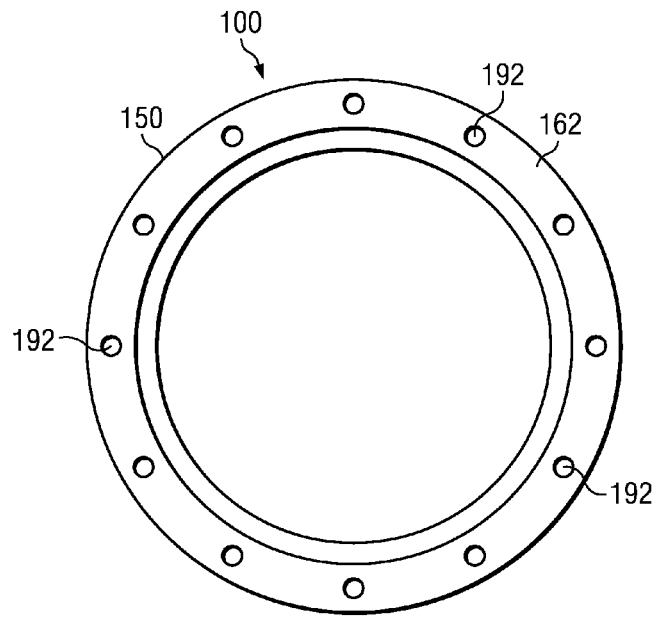
FIG. 10 shows a plan view of the rigid ring looking towards the non-sealing face.

Reference is now made to FIG. 10 which shows a plan view of the rigid ring 100 looking towards the non-sealing face 162 for the alternative implementation wherein holes 192 are provided in the non-sealing face 162 of the rigid ring.

Figure 11:
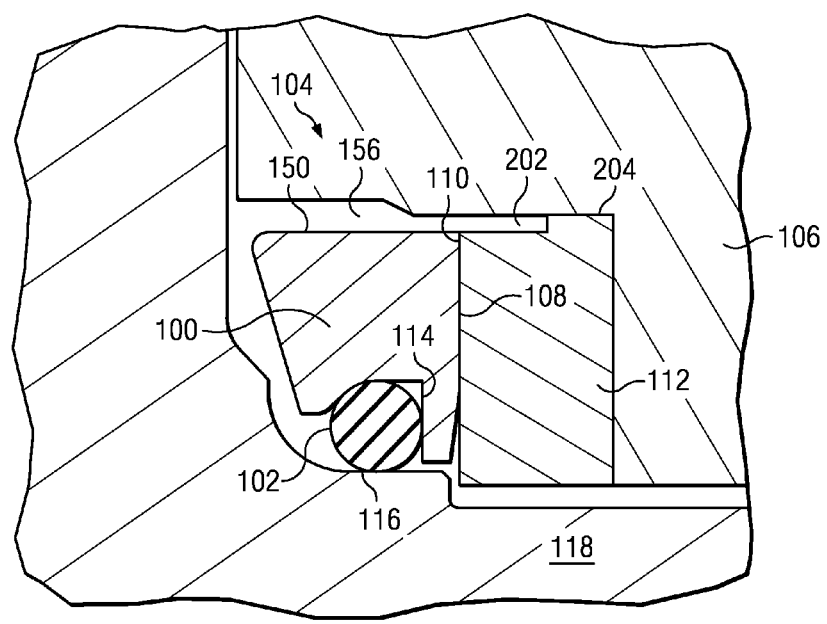
FIG. 11 illustrates a partially broken away view of a sealing system using a mechanical (or rigid) face seal in accordance with an embodiment of the present invention.

Reference is now made to FIG. 11 which illustrates a partially broken away view of a sealing system using a mechanical (or rigid) metal face seal in accordance with an embodiment of the present invention. This embodiment differs from the previous embodiments in that the groove for the cooling channel is instead formed on the radial seal face 110 extending into the metal body of the seal sleeve member 112 (that is mounted to the cone 106). Thus, this embodiment utilizes a groove 202 formed in the radial seal face 110 and having an open end which is in fluid communication with the annular aperture 156 of the seal gland 104. The groove 202 may alternatively be understood to be formed in the press-fit surface 204 of the seal sleeve member 112. It is important to control the dimensions (width and depth) of this groove 202 so as to not compromise the fitting and performance of the seal sleeve member 112 with respect to the cone at the press-fit surface 204.

Although not specifically shown in FIG. 11, it will be understood that the groove 202 could be used in conjunction with any of the grooves 152, 172, and/or holes 190 and 192 in the rigid ring 100 as shown above.

Embodiments of the invention have been described and illustrated above. The invention is not limited to the disclosed embodiments.

What is claimed is:
1. A drill tool, comprising:
a bit body;
at least one bearing shaft extending from the bit body;
a cone mounted for rotation on the bearing shaft; and a mechanical seal disposed between the bearing shaft and the cone in a seal gland, the mechanical seal including a metal seal ring with a full metal body having a metal dynamic sealing surface in sliding contact with a metal surface associated with the cone and a metal non-sealing surface exposed to an aperture in the seal gland, the mechanical seal further including at least one cooling channel formed in the metal non-sealing surface and extending into the metal body of the metal seal ring, the cooling channel having an open end in fluid communication with the aperture in the seal gland.

2. The drill tool of claim 1 wherein the metal non-sealing surface is exposed to drill cooling fluid during operation of the drill tool.

3. The drill tool of claim 2 wherein the drill cooling fluid is drilling mud.

4. The drill tool of claim 2 wherein the aperture in the seal gland fills with drill cooling fluid during operation of the drill tool.

5. The drill tool of claim 1 wherein the metal dynamic sealing surface is a metal seal face in sliding contact with another metal seal face presented by the metal surface associated with said cone.

6. The drill tool of claim 1 wherein the cooling channel formed in the metal non-sealing surface of the metal seal ring comprises at least one groove which does not permit fluid passage completely through the metal seal ring.

7. The drill tool of claim 1 wherein the cooling channel formed in the non-sealing surface of the metal seal ring comprises at least one blind hole which does not permit fluid passage completely through the metal seal ring.

8. The drill tool of claim 1 wherein the cooling channel formed in the metal non-sealing surface of the metal seal ring comprises a groove which extends at least partially around a periphery of the metal seal ring and which does not permit fluid passage completely through the metal seal ring.

9. The drill tool of claim 1 wherein the cooling channel formed in the metal non-sealing surface of the metal seal ring comprises a set of blind holes which are distributed about a periphery of the metal seal ring and which do not permit fluid passage completely through the metal seal ring.

10. The drill tool of claim 1 wherein the cooling channel formed in the non-sealing surface of the metal seal ring comprises a serration or scallop.

11. The drill tool of claim 1 wherein the non-sealing surface of the metal seal ring is oriented generally perpendicularly to the metal dynamic sealing surface.

12. The drill tool of claim 1 wherein the metal non-sealing surface of the metal seal ring is positioned on an opposite side of the metal seal ring from the metal dynamic sealing surface.

13. The drill tool of claim 1 wherein the mechanical seal further comprises an energizer adapted to urge the metal seal ring and metal dynamic sealing surface towards the cone.

14. The drill tool of claim 13 wherein the energizer is a seal ring having a static sealing surface with the bearing shaft.

15. The drill tool of claim 1 wherein the cooling channel formed in the metal non-sealing surface of the metal seal ring comprises at least one groove having a side wall oriented perpendicular to the metal non-sealing surface of the metal seal ring and wherein the at least one groove does not pass completely through the metal seal ring.

16. The drill tool of claim 1 wherein the cooling channel formed in the metal non-sealing surface of the metal seal ring comprises at least one blind hole having a side wall oriented perpendicular to the non-sealing surface of the metal seal ring and wherein the at least one blind hole does not pass completely through the metal seal ring.

17. The drill tool of claim 1 wherein the cooling channel formed in the metal non-sealing surface of the metal seal ring comprises at least one groove having a side wall oriented non-perpendicular to the non-sealing surface of the metal seal ring and wherein the at least one groove does not pass completely through the metal seal ring.

18. The drill tool of claim 1 wherein the cooling channel formed in the metal non-sealing surface of the metal seal ring comprises at least one blind hole having a side wall oriented non-perpendicular to the non-sealing surface of the metal seal ring and wherein the at least one blind hole does not pass completely through the metal seal ring.

19. The drill tool of claim 1 wherein the metal non-sealing surface of the metal seal ring defines an outer diameter of the metal seal ring.

20. The drill tool of claim 1 wherein the cone further comprises a metal seal sleeve member press-fit within an aperture of the cone, the seal sleeve member having a metal seal surface in sliding contact with the metal dynamic sealing surface of the metal seal ring and further comprising an additional cooling channel formed in the metal seal sleeve member, the additional cooling channel having an open end in fluid communication with the aperture in the seal gland.

* * * * *